(12) United States Patent
Kim et al.

(10) Patent No.: US 6,678,280 B1
(45) Date of Patent: Jan. 13, 2004

(54) VOICE PACKET TRANSMISSION CONTROL METHOD IN GATEWAY SYSTEM AND DEVICE THEREFOR

(75) Inventors: Hyun Joon Kim, Kwacheon (KR); Man Soo Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/427,558

(22) Filed: Oct. 27, 1999

(30) Foreign Application Priority Data

Oct. 28, 1998 (KR) .............................. 98/45402

(51) Int. Cl.[7] .............................. H04L 12/54
(52) U.S. Cl. ...................................... 370/429
(58) Field of Search ................. 370/352, 380, 370/400, 425–429, 392–395, 230–235, 458–468, 411–412, 516, 229, 338, 467, 493; 455/701, 67.1, 166.2, 186.1; 714/746, 799; 379/88.14; 708/492; 707/10; 709/201, 238

(56) References Cited

U.S. PATENT DOCUMENTS

| | | | |
|---|---|---|---|
| 5,231,633 A | * 7/1993 | Hluchyj et al. | 370/429 |
| 5,477,542 A | * 12/1995 | Takahara et al. | 370/389 |
| 5,497,371 A | * 3/1996 | Ellis et al. | 370/412 |
| 5,687,325 A | * 11/1997 | Chang | 710/104 |
| 5,867,494 A | * 2/1999 | Krishnaswamy et al. | 370/352 |
| 6,203,192 B1 | * 3/2001 | Fortman | 379/88.14 |
| 6,259,708 B1 | * 7/2001 | Cheng et al. | 370/493 |
| 6,324,183 B1 | * 11/2001 | Miller et al. | 370/467 |
| 6,339,594 B1 | * 1/2002 | Civanlar et al. | 370/352 |
| 6,385,193 B1 | * 5/2002 | Civanlar et al. | 370/352 |
| 6,452,915 B1 | * 9/2002 | Jergensen | 370/338 |

* cited by examiner

*Primary Examiner*—Chi Pham
*Assistant Examiner*—Prenell Jones
(74) *Attorney, Agent, or Firm*—Fleshner & Kim, LLP

(57) ABSTRACT

The present invention relates to transmission control of voice packets in a gateway system. The present invention makes a priority message having a priority level, separately stores a voice packet transmitted during communication and a data packet excluding the voice packet, on the basis of the priority level, and firstly outputs the voice packet stored in the high priority queue in accordance with the priority level.

40 Claims, 3 Drawing Sheets

VOICE PACKET TRANSMISSION CONTROL METHOD IN GATEWAY SYSTEM AND DEVICE THEREFOR

BACKGROUND OF THE INVENTION

1. Field of the Invention

The present invention relates to voice packet transmission in a gateway system of a network, and in particular to voice packet transmission in a gateway system which can reduce a voice packet delay and a delay jitter generated during voice packet transmission and reception on a network.

2. Description of the Background Art

The number of IP phone users for voice communication has been gradually increased. An IP phone system similar to a computer telephony integration CTI has been widely used. A gateway system connecting a conventional public switched telephone network PSTN to an internet network maps a station number and an IP address of a terminal (computer or IP phone), thereby enabling communication.

Here, a multimedia office communication system (hereinafter, referred to as "MOCS") is exemplified as the gateway system.

FIG. 1 is a connection view of a LAN network in a general MOCS. The MOCS includes a LAN switch board, and converts protocols of the telephone network and the LAN for connection thereof. A plurality of switching hubs SH1–SH6 and a feature server for storing IP addresses and various state information, and performing a call control or other additional functions are connected to the LAN switch board. A local server, an IP phone and a PC phone are connected to each switching hub SH1–SH6. When a call is generated from a specific station, the MOCS transmits a setup message to an IP address corresponding to the call, thereby transmitting/receiving the call.

As a real time traffic LAN environment of voice and image increases, it is important to provide a service of high quality. Especially, a voice packet delay and a delay jitter are important standards for measuring quality of service (hereinafter, referred to as "QoS"), and considerably influence on a sound quality of the MOCS.

On the other hand, a few standards are used in the MOCS. A representative standard is 802.1 p/Q. The standard compensates for the sound quality by reducing generation of the voice packet delay and the delay jitter.

FIG. 2 shows a voice packet format of the 802.1 p/Q standard. As shown therein, the voice packet format consists of an Ethernet header, a tag of 4 bytes and a voice packet of the 802.3 p/Q standard. "P" in the tag denotes a priority bit. A bit rate of a LAN card using the 802.1 p/Q standard is between 10 and 100 Mbps, identically to a bit rate of a LAN card using the 802.3 p/Q standard.

On the other hand, the LAN card employing the 802.3 p/Q standard cannot read the tag of 4 bytes added to the 802.1 p/Q standard, and accordingly recognizes the voice packet including the tag as an illegal format or does not generate priority. Thus, in order to utilize the 802.1 p/Q standard to reduce generation of the voice packet delay and the delay jitter, the LAN cards of devices connected to the entire network, namely the switch hubs and the LAN card of the PC must be replaced by the LAN cards using the 802.1 p/Q standard.

However, it is inefficient to replace the LAN cards of the 802.3 p/Q standard which are well operated by the LAN cards of the 802.1 p/Q standard. The current MOCS communicates voice of low bit rate (64 kbps) having a real time property in the LAN environment, as in a general key telephone system. As a result, to replace the originally-provided LAN cards is uneconomical.

Especially, in regard to the voice of low bit rate (64 kbps) having the real time property, the MOCS enables communication on the LAN, identically to the general key phone system. Accordingly, to replace the LAN cards does not influence on the bit rate.

Therefore, it is necessary a method for guaranteeing the QoS of the voice traffic without replacing the currently-used LAN cards.

SUMMARY OF THE INVENTION

Accordingly, it is a primary object of the present invention to guarantee the quality of service of a voice traffic in LAN environments having different standards.

It is another object of the present invention to reduce a voice packet delay and a delay jitter in LAN environments having different standards.

In order to achieve the above-described objects of the present invention, there is provided a voice packet transmission control device including: a memory, each memory region being divided into a high priority queue and a low priority queue; a central processing unit receiving a priority message, and storing a MAC address and a priority level corresponding to each IP phone in the memory; and a switch storing a voice packet transmitted during communication in the high priority queue, storing a data packet excluding the voice packet in the low priority queue, and firstly transmitting the voice packet stored in the high priority queue, on the basis of the priority levels.

In order to achieve the above-described objects of the present invention, there is provided a voice packet transmission control method including: a step of making a priority message having a priority level; a step of separately storing a voice packet transmitted during communication and a data packet excluding the voice packet, on the basis of the priority level; and a step of firstly transmitting the voice packet in accordance with the priority level.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 3:
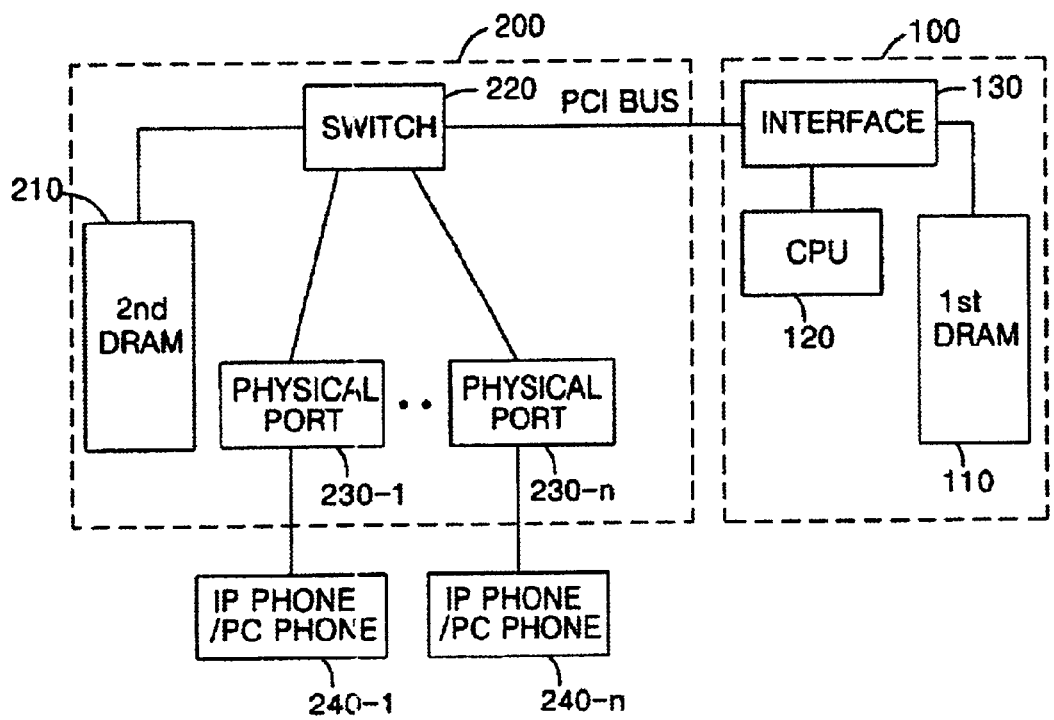
FIG. 3 is a constitutional view illustrating a voice packet transmission control device in a gateway system in accordance with a preferred embodiment of the present invention.

FIG. 3 is a constitutional view illustrating a voice packet transmission control device in a gateway system in accordance with a preferred embodiment of the present invention.

As shown therein, the voice packet transmission control device includes: a CPU board 100, a LAN switch board 200 and a plurality of IP phones 240_1–240_n connected to the LAN switch board 200. A priority message is stored as a MAC address table in a first DRAM 100 of the CPU board 100. When a call is generated by pressing telephone numbers, a CPU 120 renews the priority message stored in the first DRAM 110 corresponding to the call. An interface 130 transmits address information corresponding to the priority message to the LAN switch board 200 through an interface 130. A second DRAM 210 in the LAN switch board 200 stores a data packet for each IP phone 240_1–240_n as the MAC address table. Each memory region of the MAC address table is divided into a high priority queue and a low priority queue. A voice packet having priority is stored in the high priority queue, and a data packet excluding the voice packet is stored in the low priority queue. Here, the voice packet having priority implies a voice data and a signal for voice transmission which are transmitted from the IP phone during communication, and the data packet is a data excluding the voice packet having priority, such as status information, data information and general PC data transmitted from the IP phone or PC phone, when the communication is finished. In addition, if the voice packet has priority, a priority level is "1", and if not, the priority level is "0". A switch 220 designates a position of the MAC address table for each IP phone 240_1–240_n in order to store the data packet, analyzes whether the data packet has priority, namely the priority level is set to be "1", designates the high priority queue or the low priority queue, and stores the data packet in the designated priority queue. When the data packet is stored, if the communication between the IP phones 240_1–240_n is started, the data packet stored in the corresponding priority queue is outputted to the IP phones 240_1–240_n, respectively, in accordance with the MAC address and the priority level, thereby enabling the voice transmission through the IP phones 240_1–240_n.

On the other hand, the IP phones 240_1–240_n are connected to the switch 220 through physical ports 230_1–230_n, respectively.

The operation of the voice packet transmission control device in accordance with the preferred embodiment of the present invention will now be described.

When the voice communication is performed through the IP phones 240_1–240_n, a caller pushes a key station number or telephone number of the other party through the IP phones 240_1–240_n. In case the voice communication is carried out through the PC, the caller can push a telephone number on a program window.

When the caller pushes the telephone number of the IP phone 240_n of the other party by using the IP phone 240_1, the IP phone 240_1 receives an internet protocol IP of the IP phone 240_n of the other party which corresponds to the pressed telephone number by a propriety protocol of the system, and makes a priority message data corresponding to the internet protocol IP, and transmits it to the CPU 120

The above-mentioned operation will now be described in more detail with reference to FIG. 4.

Figure 1:
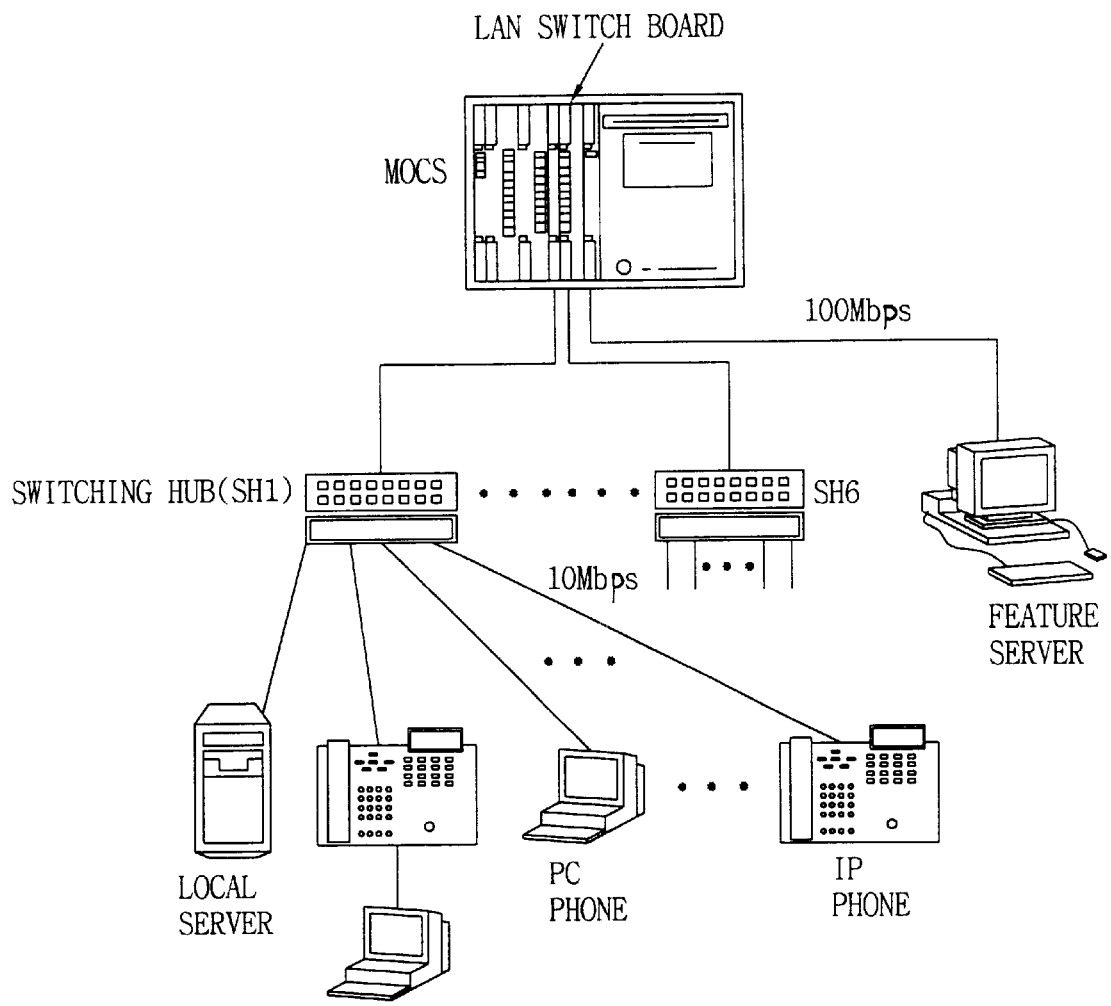
FIG. 1 is a connection view illustrating a LAN network of a general MOCS.
Figure 2:
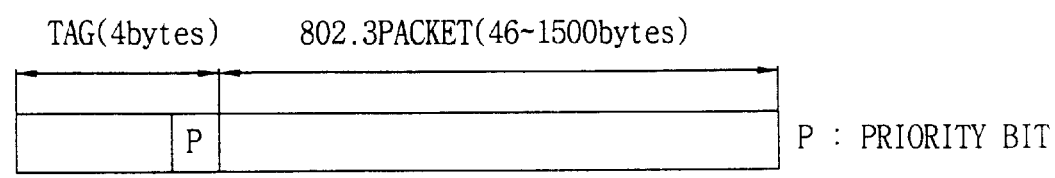
FIG. 2 shows a voice packet format of the 802.1 p/Q standard.
Figure 4:
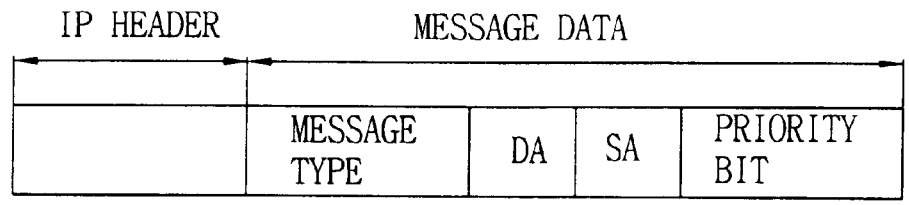
FIG. 4 shows a format of a priority message in accordance with the preferred embodiment of the present invention.

FIG. 4 shows a format of the priority message data. It corresponds to the data of the voice packet format having the 802.1 p/Q standard, as shown in FIG. 2. The priority message data consists of an IP header and a message data. The message data includes a message type, a destination address DA, a source address SA and a priority bit. A MAC address of the priority message is recorded in the message type. The MAC address is divided into Req_MAC_Addr, Ans_MAC_Addr and Req_MAC_Priority according to a characteristic of a message type. Req_MAC_Addr is employed when a call is requested, Ans_MAC_Addr is utilized when the requested call is responded, and Req_MAC_Priority is used when the priority is decided.

The destination address DA denotes an address of the other party, the source address SA denotes a MAC address of the IP phone used by the caller, and the priority bit denotes a priority level value.

When the caller presses the telephone number of the IP phone 240_n by using the IP phone 240_1 connected to the physical port 230_1, the IP address of the IP phone 240_n is transmitted to the IP phone 240_1 by the propriety protocol of the MOCS. The IP phone 240_1 makes the priority message, and transmits it to the IP address of the IP phone 240_n. Here, the message type of the priority message is recorded as Req_MAC_Addr, and nothing is recorded in the message data. After reading Req_MAC_Addr which is the message type of the received priority message, the IP phone 240_n renews the message type into Ans_MAC_Addr, records its address on the data address DA of the message data, and transmits the varied priority message to the IP phone 240_1.

The IP phone 240_1 varies the message type of the received priority message into Req_MAC_Priority, records its MAC address on the source address SA of the message data, and varies the priority bit into a high level ("1"). Thereafter, the IP phone 240_1 records the IP address of the CPU 120 on the IP header, and transmits the varied priority message. The priority message is transmitted to the CPU 120 of the CPU board 100 via the interface 130. In the priority message transmitted to the CPU 120, the IP address of the CPU 120 is recorded on the IP header, and nothing is recorded on the message type. The MAC address of the IP phone 240_n is recorded on the data address DA, and the MAC address of the IP phone 240_1 is recorded on the source address DA. The CPU 120 renews the address information stored in the MAC address table of the first DRAM 110, on the basis of the inputted priority message. In more detail, the CPU 120 records the MAC address on a first row of the MAC address table of the first DRAM 110, and stores the priority level value corresponding to the MAC address on a second row thereof, as shown in the following table.

TABLE

| MAC address | Priority Bit |
|---|---|
| DA(IP phone 240_n) | 1 |
| SA(IP phone 240_1) | 1 |
| . | . |
| . | . |
| . | . |

As shown in the above table, the CPU 120 renews the MAC address of the IP phone 240_1 at an address corresponding to the source address SA in the MAC address table of the first DRAM 110, renews the MAC address of the IP phone 240_n at the data address DA, and renews the priority bit values corresponding respectively to the data address DA and the source address SA into "1".

In addition, the second DRAM 210 of the LAN switch board 200 is directly accessed by the CPU 120 through the interface 130, the PCI bus and the switch 220, or accessed by the switch 220. Accordingly, the priority bit of the data address DA or the source address SA in the MAC address table of the second DRAM 210 is varied to high.

The switch 220 judges whether the data packet inputted through the physical port has priority (whether the priority level value is set to be "1"), on the basis of the address information. According to the judgment result, the switch 220 designates the high priority queue or low priority queue, and stores the inputted data packet on the designated priority queue. Thus, when the priority level value of the data packet is "1", the voice packet (having priority) included in the data packet is stored in the high priority queue, and the residual data packet is stored in the low priority queue. To the contrary, in case the priority level is "0", the voice packet having priority does not exist in the data packet. As a result, the whole data packet is stored on the low priority queue.

Thereafter, the switch 220 reads the plurality of addresses stored in the MAC address table, and assigns the corresponding physical ports 230_1–230_n.

The assigned voice packets are sequentially transmitted/received through the physical ports in accordance with a Weighted Round-Robin method.

The transmission/reception process according to the Weighted Round-Robin method will now be described in detail with reference to FIG. 5.

Figure 5:
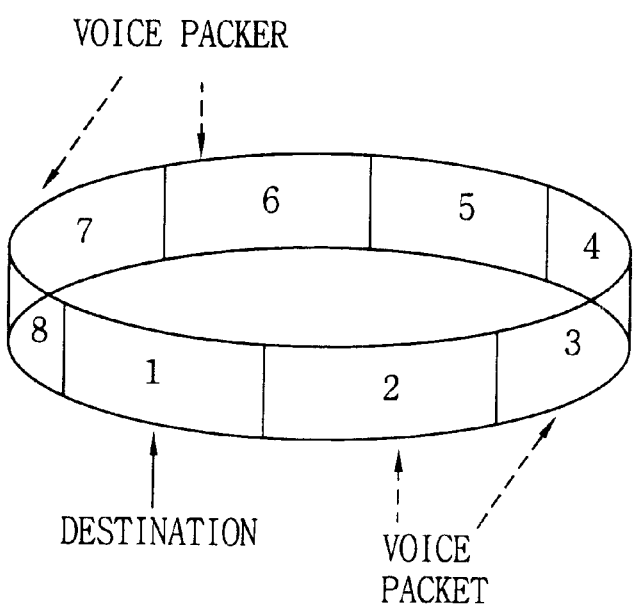
FIG. 5 shows a Weighted Round-Robin method in accordance with the preferred embodiment of the present invention.

FIG. 5 shows the Weighted Round-Robin method in accordance with the preferred embodiment of the present invention. First, it is presumed that the number of the physical ports is eight, traffics from seven physical ports 230_2–230_8 are concentrated on a first physical port 230_1, and the voice packet is received from the seven physical ports 230_2–230_8. A weight value is set to be "5".

The switch 220 reads the MAC address and the priority level which correspond to the second physical port 230_2 from the MAC address table of the second DRAM 210. The priority level is "1", and thus the switch 220 outputs the voice packet stored in the high priority queue through the first physical port 230_1. Thereafter, the switch 220 reads the MAC address and the priority level corresponding to the third port 230_3, outputs the voice packet stored in the high priority queue through the first port 230_1, and sequentially outputs the voice packets corresponding to the fourth physical port 230_4, the fifth physical port 230_5 and the sixth physical port 230_6 through the first physical port 230_1.

Since the weight value is "5", the voice packets inputted to the seventh port 230_7 and the eighth port 230_8 remain as packets to be succeedingly transmitted.

Then, the low priority packets stored in the respective low priority queues corresponding to the seven ports 230_2–230_8 are outputted through the first port 230_1, and the voice packets stored in the high priority queues are transmitted through the seventh port 230_7 and the eighth port 230_8.

When the call is finished, the IP phone 240_1 varies the message type of the priority message into Req_MAC_Priority, records its MAC address on the source address SA of the message data, records the address of the IP phone 240_n on the data address DA of the message data, varies the priority bit into the low level, and transmits the varied priority message into the CPU 120.

The CPU 120 searches for the corresponding address to the source address SA in the MAC address table, on the basis of the inputted priority message, renews the priority bit value corresponding to the source address SA into "0", searches for the corresponding address to the data address DA, and renews the priority bit value corresponding to the data address DA into "0", as shown in the table below.

TABLE

| MAC address | Priority Bit |
| --- | --- |
| DA(IP phone 240_n) | 0 |
| SA(IP phone 240_1) | 0 |
| . | . |
| . | . |
| . | . |

In addition, the CPU 120 renews the address information stored in the MAC address table of the second DRAM 210 of the LAN switch board 200 in the same manner.

Thereafter, the present invention will now be compared in the voice packet delay with the conventional art. Presumptions are made as in the Weighted Round Robin method, in a worst case. In addition, it is presumed that the data packets are 1518 bytes(1518*8 bits), and the voice packets occupy 300 bytes(300*8 bits) among them.

In the conventional art, a worst case delay Dshared_hub of the voice packet of the shared hub is represented by the following Expression.

$$\text{Dshared\_hub} = \{(2^1-1)+(2^2-1)+(2^3-1)+\ldots+(2^{10}-1)\times 7\}\times 5.12\ \mu\text{sec} + \{0.64\ \mu\text{sec} \times 16\} = 41.86\ \text{msec}$$

In addition, in the conventional art, a worst case delay Dswitch_hub of the voice packet of the switch hub is represented by the following Expression.

$$\text{Dswitch\_hub} = \text{general processing time } (61\ \mu\text{sec}) + 7\times(1518\times 8/100\ \text{Mbps}) + 300\times 8/100\ \text{Mbps} = 0.865\ \text{mec}$$

According to the present invention, a worst case delay $D_{LAN}$ of the voice packet is represented by the following Expression.

$$6\ \mu\text{sec} + 5(300\times 8/100\ \text{Mbps}) + (1518\times 8/100\ \text{Mbps}) + 2(300\times 8/100\ \text{Mbps}) = 0.295\ \text{msec}$$

Here, "5(300×8/100 Mbps)" is a delay time by the second to sixth physical ports 230_2–230_6, "1518×8/100 Mbps" is a delay time by one data packet, and "2(300×8/100 Mbps)" is a delay time by the seventh and eighth physical ports 230_7, 230_8.

As known from the above comparison result, in the worst case, the delay D. according to the present invention is decreased more than the voice packet delay Dshared_hub of the shared hub in the conventional art by approximately 142 times, and decreased more than the voice packet delay Dswitch_hub of the switch hub in the conventional art by approximately 2.9 times.

In addition, as explained above, the voice packet is stored in the high priority queue of the second DRAM 210 by 300 bytes, and thus the delay jitter may be reduced as much as the voice packet delay.

As discussed earlier, the present invention considers the voice priority levels of each port for the voice communication, and thus firstly transmits the voice packet stored in the high priority queue. As a result, it is unnecessary to replace the LAN cards for the voice priority.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A packet-transmission control device for transmitting voice information in a gateway system, comprising:
   a first memory for storing a priority table;
   a CPU for renewing the priority table of the first memory in accordance with a priority message received from a sending terminal;
   a second memory for storing a MAC address table having a high-priority queue region and a low-priority queue region; and
   a switch for determining whether a packet received from the sending terminal has priority, and for storing information in the packet in at least one of the high-priority queue region and the low-priority queue region of the MAC address table based on whether the packet has priority.

2. The device according to claim 1, wherein the sending terminal recognizes a MAC address input from another terminal, generates the priority message, and transmits the priority message to the CPU.

3. The device according to claim 1, wherein the priority message includes a destination address field and a source address field, and wherein a MAC address of a destination terminal is recorded in the destination address field, and wherein a MAC address of the sending terminal is recorded in the source address field.

4. The device according to claim 1, wherein the switch stores at least a portion of the packet in the high-priority queue region when the priority level has a first value, and stores the packet in the low-priority queue region when the priority level has a second value.

5. The device according to claim 1, wherein a plurality of packets are sequentially transmitted in accordance with a Weighted Round-Robin method.

6. The device according to claim 5, wherein the plurality of packets are repeatedly output based on a weighted value.

7. A voice packet-transmission control device for transmitting voice information in a gateway system, comprising:
   a memory having a high-priority queue region and a low-priority queue region;
   a CPU for receiving a priority message, and storing a MAC address and a priority level corresponding to each of a plurality of IP phones into the memory; and
   a switch for determining whether a packet received from the sending terminal has priority, and for storing information in the packet in at least one of the high-priority queue region and the low-priority queue region of the memory based on whether the packet has priority.

8. The device according to claim 7, wherein a first one of the IP phones making a call recognizes a MAC address input from a second one of the IP phones, generates the priority message, and transmits the priority message to the CPU.

9. The device according to claim 7, wherein the priority message includes a destination address field and a source address field, and wherein a MAC address of the second internet phone is recorded in the destination address field, and wherein a MAC address of the first internet phone is recorded in the source address field.

10. The device according to claim 7, wherein the switch stores at least a portion of the packet in the high-priority queue region when the priority level has a first value, and stores the packet in the low-priority queue region when the priority level has a second value.

11. The device according to claim 7, wherein a plurality of packets are sequentially transmitted in accordance with a Weighted Round-Robin method.

12. The device according to claim 11, wherein the plurality of packets are repeatedly output based on a weighted value.

13. A packet-transmission control method for transmitting voice information in a gateway system, comprising:
    generating a priority message having a priority level;
    storing voice information in a received packet in a high-priority queue region of a memory and storing additional information in the packet in a low-priority queue region of the memory, said storing steps being performed based on the priority level; and
    transmitting the voice information in the packet in accordance the priority level.

14. The method according to claim 13, further comprising:
    sequentially transmitting a plurality of packets in accordance with a Weighted Round-Robin method.

15. The method according to claim 14, wherein the plurality of packets are repeatedly output based on a weighted value.

16. The device according to claim 1, wherein the packet is a data packet which includes a voice packet, and wherein when the data packet is determined to have priority the switch stores the voice packet in the high-priority queue region of the MAC address table and stores additional information in the data packet in the low-priority queue region.

17. The device according to claim 16, wherein the switch transmits the voice packet to a destination terminal before transmitting the additional information from the data packet.

18. The device according to claim 1, wherein the packet is a data packet, and wherein when the data packet is determined not to have priority the switch stores the data packet in the low-priority queue region of the MAC address table.

19. The device according to claim 1, wherein the switch determines whether the packet has priority based on a priority level value associated with the packet.

20. The device according to claim 1, wherein the CPU renews address information and priority information in the priority table of the first memory in accordance with the priority message received from the sending terminal.

21. The device according to claim 20, wherein said address information and priority information correspond to addresses and priority level values of both the sending terminal and a destination terminal.

22. The device according to claim 7, wherein the packet is a data packet which includes a voice packet, and wherein when the data packet is determined to have priority the switch stores the voice packet in the high-priority queue region of the memory and stores additional information from the data packet in the low-priority queue region.

23. The device according to claim 22, wherein the switch transmits the voice packet to a destination IP phone before transmitting the additional information from the data packet.

24. The device according to claim 7, wherein the packet is a data packet, and wherein when the data packet is determined not to have priority the switch stores the data packet in the low-priority queue region of the memory.

25. The device according to claim 7, wherein the switch determines whether the packet has priority based on a priority level value associated with the packet.

26. The device according to claim 7, wherein the first memory stores the priority message in a pattern of a MAC address table.

27. The method according to claim 13, further comprising:

determining a priority level of the packet; and when the packet is determined to have a predetermined priority level, the storing step includes storing the packet in the low-priority queue region of the memory.

28. The method according to claim 13, wherein the determining step is performed based on a priority level value associated with the packet.

29. A method for communicating voice information between terminals, comprising:

receiving a priority message from a first IP terminal;

storing address information contained in the priority message in a first memory;

determining a priority of a packet received from the first IP terminal;

storing information in the packet in at least one of a first queue region and a second queue region of a second memory based on the priority of the packet; and transmitting said information in the packet to a second IP terminal based on the address information in the first memory, wherein the priority message has a voice packet format which corresponds to an 802.1 p/O standard.

30. The method of claim 29, further comprising:

storing voice information in the packet in the first queue region and storing additional information in the packet in the second queue region if the priority of the packet is determined to have a first value.

31. The method of claim 30, wherein the transmitting step includes:

transmitting the voice information stored in the first queue region to the second IP terminal before the additional information stored in the second queue region is transmitted.

32. The method of claim 29, wherein the first queue region and the second queue region are included in a MAC address table stored in the second memory.

33. The method of claim 29, wherein the first IP terminal and the second IP terminal are ones selected from a group consisting of an IP phone and a PC phone.

34. The method of claim 29, wherein generation of the priority message is initiated based on one of a telephone number and a key station number entered into the first IP terminal.

35. The method of claim 29, wherein the first IP terminal and the second IP terminal are connected to a local area network.

36. The method of claim 29, further comprising:

receiving a first priority message from the first IP terminal, said first priority message including a request for a MAC address of the second IP terminal; and transmitting the first priority message to the second IP terminal.

37. The method of claim 36, further comprising:

receiving a second priority message from the second IP terminal, said second priority message including a MAC address of the second IP terminal and answer MAC address information; and transmitting the second priority message to the first IP terminal.

38. The method of claim 37, further comprising:

receiving a third priority message from the first IP terminal, said third priority message including a MAC address of the first IP terminal, the MAC address of the second IP terminal, and request MAC priority information, wherein said storing step includes storing the MAC address of the first IP terminal and the MAC address of the second IP terminal in the first memory.

39. The method of claim 38, further comprising:

storing priority level values in association with the MAC addresses of the first and second IP terminals in the first memory.

40. The method of claim 29, wherein said transmitting step is performed based on a weighted Round-Robin method.

* * * * *